United States Patent
Shuto et al.

(10) Patent No.: US 8,585,366 B2
(45) Date of Patent: Nov. 19, 2013

(54) CONTRA-ROTATING PROPELLER MARINE PROPULSION DEVICE

(75) Inventors: Hideki Shuto, Tokyo (JP); Saiki Nishiyama, Tokyo (JP)

(73) Assignee: Japan Marine United Corporation, Tokyo (JP)

( * ) Notice: Subject to any disclaimer, the term of this patent is extended or adjusted under 35 U.S.C. 154(b) by 591 days.

(21) Appl. No.: 12/812,025

(22) PCT Filed: Nov. 28, 2008

(86) PCT No.: PCT/JP2008/071641
§ 371 (c)(1),
(2), (4) Date: Sep. 22, 2010

(87) PCT Pub. No.: WO2009/087831
PCT Pub. Date: Jul. 16, 2009

(65) Prior Publication Data
US 2011/0033296 A1    Feb. 10, 2011

(30) Foreign Application Priority Data
Jan. 8, 2008   (JP) ................................ 2008-000938

(51) Int. Cl.
*B63H 5/10*    (2006.01)

(52) U.S. Cl.
USPC ...................... 416/129; 416/170 R

(58) Field of Classification Search
USPC ................. 416/174, 170 R, 128, 129, 146 A; 440/79–81, 83; 184/6.12
See application file for complete search history.

(56) References Cited

U.S. PATENT DOCUMENTS

| | | | |
|---|---|---|---|
| 3,396,800 A | | 8/1968 | Hillander et al. |
| 3,527,545 A | * | 9/1970 | Campbell et al. ............. 416/125 |
| 4,642,059 A | * | 2/1987 | Nohara ........................... 440/75 |
| 5,374,208 A | * | 12/1994 | von Bergen et al. ............ 440/80 |

(Continued)

FOREIGN PATENT DOCUMENTS

| | | |
|---|---|---|
| JP | 54-87600 | 6/1979 |
| JP | 55-36020 | 3/1980 |

(Continued)

OTHER PUBLICATIONS

English translation of Office Action issued in Korean application 10-2010-7013243 on Jun. 26, 2012.

(Continued)

*Primary Examiner* — Edward Look
*Assistant Examiner* — William Grigos
(74) *Attorney, Agent, or Firm* — Griffin & Szipl, P.C.

(57) ABSTRACT

The thrust load of an outer shaft is received by a contra-rotating thrust bearing provided in a boss of a front propeller and transmitted to an inner shaft. The combined thrust load of the outer shaft and the inner shaft is received by an inner thrust bearing provided on the bow side of the power transmission unit and transmitted to a ship body. The rotational force of an outer output shaft is transmitted to the outer shaft via a flexible joint (gear coupling). Thus, the thrust load of the outer shaft is transmitted to the ship body only via the inner shaft without being directly transmitted to the ship body, and the axial displacement and angular displacement are allowed by the gear coupling, so that it is possible to eliminate the influence of the change of hull deformation on the shaft center of the outer shaft.

6 Claims, 4 Drawing Sheets

(56) References Cited

U.S. PATENT DOCUMENTS

| | | | |
|---|---|---|---|
| 5,795,200 A * | 8/1998 | Larkin | 440/81 |
| 6,506,120 B1 * | 1/2003 | Lockwood | 464/88 |
| 2008/0089786 A1 * | 4/2008 | Sinreich | 416/129 |

FOREIGN PATENT DOCUMENTS

| | | | |
|---|---|---|---|
| JP | 60-18094 | | 2/1985 |
| JP | 60-18095 | | 2/1985 |
| JP | 61-52599 | | 4/1986 |
| JP | 61-94611 | | 6/1986 |
| JP | 61-99752 | | 6/1986 |
| JP | 62-181998 | | 8/1987 |
| JP | 63-66400 | | 5/1988 |
| JP | 1-87996 | | 6/1989 |
| JP | 1-237289 | A | 9/1989 |
| JP | 1-240399 | | 9/1989 |
| JP | 6-27519 | * | 7/1994 |
| JP | 6-27519 | Y2 | 7/1994 |
| JP | 7-10085 | | 1/1995 |
| JP | 7-33084 | A | 2/1995 |
| JP | 7-52881 | | 2/1995 |
| JP | 7-21437 | Y2 | 5/1995 |
| JP | 11-270571 | | 10/1999 |
| JP | 2005-67436 | A | 3/2005 |

OTHER PUBLICATIONS

International Search Report, issued in corresponding application PCT/JP2008/071641, completed Feb. 23, 2009, mailed Mar. 3, 2009.
International Search Report, issued in co-pending application of PCT/JP2008/071650, completed Feb. 20, 2009, mailed Mar. 3, 2009.
Office Action issued in co-pending related U.S. Appl. No. 12/812,450 on Dec. 7, 2012.
Notice of Allowance issued in co-pending related U.S. Appl. No. 12/864,494 on Feb. 13, 2013.

* cited by examiner

CONTRA-ROTATING PROPELLER MARINE PROPULSION DEVICE

This is a National Phase Application in the United States of International Patent Application No. PCT/JP2008/071641 filed Nov. 28, 2008, which claims priority on Japanese Patent Application No. 2008-000938, filed Jan. 8, 2008. The entire disclosures of the above patent applications are hereby incorporated by reference.

BACKGROUND OF THE INVENTION

1. Technical Field of the Invention

The present invention relates to a contra-rotating propeller marine propulsion device.

2. Description of the Related Art

A contra-rotating propeller is a propeller system in which the rotational energy output from a front propeller is recovered by a rear propeller, which rotates in a direction opposite to the front propeller and changed into a propulsive force so that high propeller efficiency is obtained. Hereinafter, a marine propulsion device equipped with a contra-rotating propeller is referred to as a "contra-rotating propeller marine propulsion device." The contra-rotating propeller marine propulsion device is disclosed in the following Patent Documents 1 and 2, for example.

As one of conventional examples of the contra-rotating propeller marine propulsion device, the "propulsion device of ship" disclosed in Patent Document 1 is shown in FIG. 1. In FIG. 1, a propulsion device 100 of a ship is adapted such that an inner shaft 102 and an outer shaft 101 are concentrically disposed, a rear propeller 104 is attached to the inner shaft 102, a front propeller 103 is attached to the outer shaft 101, the inner shaft 102 is rotationally driven by a main engine 105, such as a diesel engine or a gas turbine serving as a first driving unit, and the outer shaft 101 is rotationally driven by a main engine 106, such as a diesel engine or a gas turbine serving as a second driving unit. In addition, reference numeral 107 designates a driving shaft of the main engine 106, and reference numeral 108 designates a gear transmission unit.

[Patent Document 1] Japanese Patent Application Laid-Open No. 2005-67436
[Patent Document 2] Japanese Patent Application Laid-Open No. 7-33084

In the contra-rotating propeller, the inner shaft is thinner and longer than the outer shaft. Therefore, it is possible sufficiently absorb the influence of the change of hull deformation on the shaft center. However, in the outer shaft itself, which is thicker than the inner shaft, it is difficult to sufficiently absorb the influence of the change of hull deformation on the shaft center. In the conventional contra-rotating propeller marine propulsion device described above, the influence of the change of hull deformation on the shaft center of the outer shaft is not taken into consideration. Accordingly, it is desired to solve such a problem.

SUMMARY OF THE INVENTION

The invention was made in view of the above problems, and aims at providing a contra-rotating propeller marine propulsion device capable of eliminating the influence of the change of hull deformation on the shaft center of an outer shaft.

In order to solve the above-mentioned problem, the contra-rotating propeller marine propulsion device of the invention adopts the following technical means.

(1) The invention provides a contra-rotating propeller marine propulsion device including a hollow outer shaft having a front propeller attached to a rear end thereof and rotatably supported by a ship body, an inner shaft having a rear propeller attached to a rear end thereof and rotatably supported in the outer shaft, a driving unit that is a rotational driving power of the outer shaft and the inner shaft, and a power transmission unit which transmits the rotational driving force of the driving unit to the outer shaft and the inner shaft, and making the front propeller and the rear propeller rotate in directions opposite to each other. The propulsion device includes a contra-rotating thrust bearing which receives the thrust load from the outer shaft and transmits the thrust load to the inner shaft, and an inner thrust bearing which receives the thrust load from the inner shaft and transmits the thrust load to the ship body. The power transmission unit has an outer output shaft, which is arranged coaxially with the outer shaft to transmit a rotational driving force to the outer shaft, and the outer output shaft and the outer shaft are connected together via a hollow flexible joint.

According to the construction of the invention, the thrust load of the outer shaft is received at the inner shaft by the contra-rotating thrust bearing, the combined thrust load of the outer shaft and the inner shaft is received at the ship body by the inner thrust bearing, and the rotational force of the outer output shaft is transmitted to the outer shaft via the flexible joint. Thus, the thrust load of the outer shaft is transmitted to the ship body only via the inner shaft without being directly transmitted to the ship body, and the misalignment of the axial center is allowed by the flexible joint, so that it is possible to eliminate the influence of the change of hull deformation on the shaft center of the outer shaft. In addition, one or a plurality of driving units may be provided.

(2) In the contra-rotating propeller marine propulsion device of the above (1), preferably, the flexible joint is a gear coupling.

Since the gear coupling has a high allowable transmission torque and allows not only angular displacement but axial displacement, the gear coupling is very suitable as a joint which connects the outer output shaft and the outer shaft.

(3) In the contra-rotating propeller marine propulsion device of the above (2), preferably, a hood which covers the gear coupling is provided on the stern side of the power transmission unit, and lubricant oil is supplied to the gear coupling; and the hood is provided with at least one oil-resist plate which has a circular central opening into which the gear coupling is inserted and prevents or suppresses the leakage of the lubricant oil from the gear coupling side towards an engine room.

According to the above construction, it is possible to effectively lubricate the gear coupling, and it is possible to prevent or suppress the leakage of the lubricant oil towards the engine room.

(4) In the contra-rotating propeller marine propulsion device of the above (3), preferably, two annular convex portions which protrude radially outward and extend over the whole periphery in a peripheral direction are provided at an outer periphery of the gear coupling so as to be separated from each other in an axial direction, and the oil-resist plate is arranged so that an inner peripheral end of a central opening thereof is inserted to between the two annular convex portions.

According to the above construction, since a labyrinth structure is formed by the oil-resist plate and the annular convex portion, it is possible to more effectively prevent the leakage of the lubricant oil towards the engine room.

(5) In the contra-rotating propeller marine propulsion device of the above (1), preferably, a boss of the front propeller and the outer shaft which are parts separate from each other are connected and fixed together in an axial direction, and an annular recess is formed between the boss of the front propeller and the outer shaft; and the contra-rotating thrust bearing is provided in the annular recess.

According to the above construction, since the contra-rotating thrust bearing is arranged in the boss of the front propeller, it is possible to construct a contra-rotating propeller unit by coaxially assembling the outer shaft to which the front propeller is attached and the inner shaft to which the rear propeller is attached by incorporation of the contra-rotating thrust bearing in advance during manufacture. For this reason, it is possible to reduce assembling processes in the engine room of the ship body by performing an incorporating process of the contra-rotating thrust bearing before the contra-rotating propeller unit is loaded on the ship body.

(6) In the contra-rotating propeller marine propulsion device of the above (1), preferably, the driving unit includes a first driving unit that is a rotational driving power of the outer shaft, and a second driving unit that is a rotational driving power of the inner shaft, and the power transmission unit independently transmits the rotational driving forces of the first driving unit and the second driving unit to the outer shaft and the inner shaft, respectively.

According to the above construction, since the outer shaft and the inner shaft are respectively driven by the independent driving powers, even if one of the driving powers fails, it is possible to continue the operation of a ship by driving the front propeller or the rear propeller by the other driving power.

According to the contra-rotating propeller marine propulsion device of the invention, an excellent effect capable of eliminating the influence of the change of hull deformation on the shaft center of the outer shaft is obtained.

DESCRIPTION OF THE PREFERRED EMBODIMENT

Figure 1:
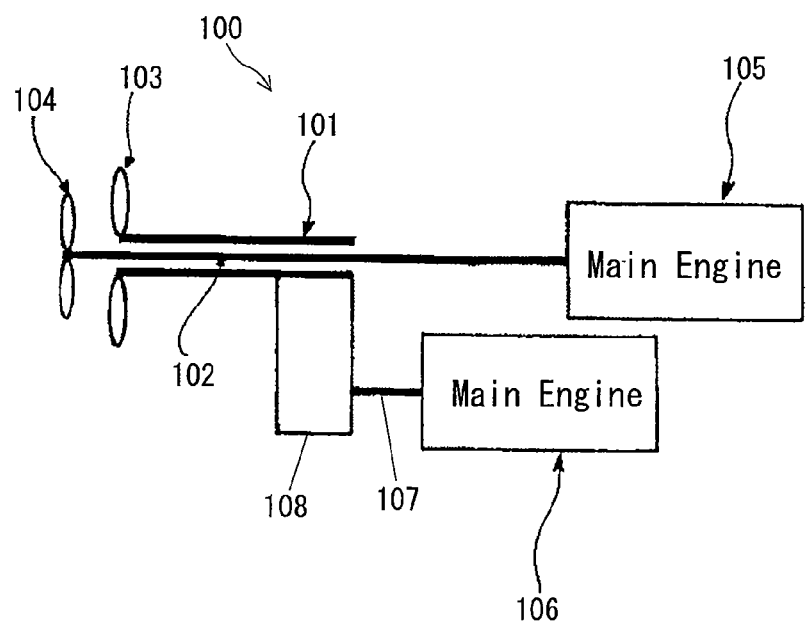
FIG. 1 is a view illustrating a prior art.

Preferred embodiments of the invention will now be described in detail with reference to the accompanying drawings. In addition, in the respective drawings, the same reference numerals will be given to common portions, and duplicate description thereof will be omitted.

Figure 2:
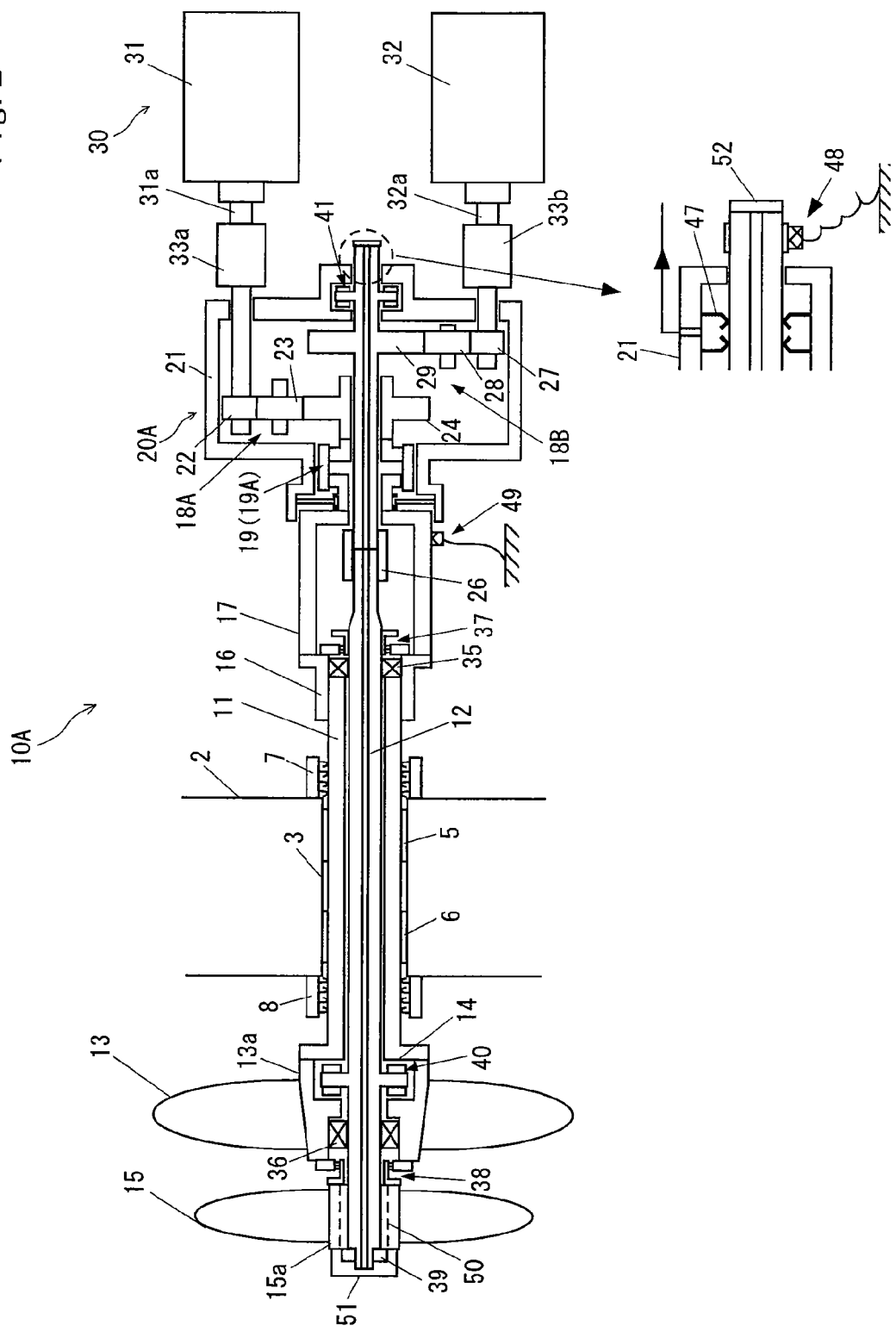
FIG. 2 is a schematic plan view of a contra-rotating propeller marine propulsion device according to a first embodiment of the invention.

FIG. 2 is a schematic plan view of a contra-rotating propeller marine propulsion device 10A according to a first embodiment of the invention. In FIG. 2, the contra-rotating propeller marine propulsion device 10A (hereinafter simply referred to as a "propulsion device") includes an outer shaft 11 to which a front propeller 13 is attached, an inner shaft 12 to which a rear propeller 15 is attached, a driving unit 30 that is a rotational driving power of the outer shaft 11 and the inner shaft 12, and a power transmission unit 20A which transmits the rotational driving force of the driving unit 30 to the outer shaft 11 and the inner shaft 12.

The outer shaft 11 is a hollow part, and is set up through a stern tube 3 provided at a ship body 2. A front-side bush 5 and a rear-side bush 6 are provided between the stern tube 3 and the outer shaft 11, and thereby the outer shaft 11 is rotatably supported by the ship body 2. In order to prevent the leakage of lubricant oil in the stern tube 3 towards the engine room, a bow-side end face of the stern tube 3 is provided with a bow-side stern tube seal unit 7. In order to prevent the leakage of lubricant oil in the stern tube 3 towards the seawater, a stern-side end face of the stern tube 3 is provided with a stern-side stern tube seal unit 8.

The front propeller 13 is attached to a rear end of the outer shaft 11. The front propeller 13 has a boss 13a at the central portion thereof, and a bow-side end face of the boss 13a and a stern-side end face of the outer shaft 11 are connected and fixed together by connecting means, such as a bolt. An outer sleeve joint 16 is connected and fixed to a bow-side end of the outer shaft 11.

A hollow outer intermediate shaft 17 is connected and fixed to a bow-side end of the outer sleeve joint 16. The outer intermediate shaft 17 includes a construction capable of being radially split into a plurality of (two or more) pieces so that the maintenance of accessory parts (contra-rotating front seal unit 37, etc.) of the inner shaft 12 is able to be performed.

The inner shaft 12 has the rear propeller 15 attached to the rear end thereof, and is rotatably supported in the outer shaft 11. The rear propeller 15 has a boss 15a at the central portion thereof, is fitted into a rear end of the inner shaft 12 at the boss 15a, and is fixed to the inner shaft 12 by a propeller nut 39.

In the propulsion device 10A, in order to rotatably support the inner shaft 12 by the outer shaft 11, a front-side radial bearing 35 and a rear-side radial bearing 36 are set up. In the exemplary construction of FIG. 2, the front-side radial bearing 35 is arranged between the outer sleeve joint 16 and the inner shaft 12, and the rear-side radial bearing 36 is arranged between the boss 13a of the front propeller 13 and the inner shaft 12. In addition, the arrangement positions of the front-side radial bearing 35 and the rear-side radial bearing 36 are not limited to the above-described positions. For example, the arrangement positions may be between the front end and rear end of the outer shaft 11, and the inner shaft 12.

In the propulsion device 10A, a contra-rotating thrust bearing 40 which receives the thrust load of the outer shaft 11 and transmits the thrust load to the inner shaft 12 is arranged. In the exemplary construction of FIG. 2, the contra-rotating thrust bearing 40 is provided in the boss of the front propeller 13. More specifically, an annular recess 14 is formed between the boss 13a of the front propeller 13 and the outer shaft 11, and the contra-rotating thrust bearing 40 is provided in this annular recess 14. The contra-rotating thrust bearing 40 may be, for example, a tilting pad type thrust bearing.

In order to lubricate the front-side radial bearing 35, the rear-side radial bearing 36, and the contra-rotating thrust bearing 40, contra-rotating lubricant oil is supplied to between the boss 13a of the outer shaft 11 or the front propeller 13, and the inner shaft 12 from a contra-rotating lubricant oil supply unit which is not shown. In order to prevent the contra-rotating lubricant oil from leaking out, a contra-rotating front seal unit 37 is arranged at the bow-side end face of the outer sleeve joint 16, and a contra-rotating rear seal unit 38 is arranged at the stern-side end face of the boss 13a of the front propeller 13.

The contra-rotating lubricant oil is adapted so as to lubricate the rear-side radial bearing 36, and then pass through a gap between a seal liner of the contra-rotating rear seal unit 38, and the inner shaft 12, pass through an oil passing hole 50 provided in the boss 15a of the rear propeller 15, enter the hollow portion of the inner shaft 12 through the inner side of a propeller cap 51 attached to the rear end of boss 15a, pass through the seal unit 47 provided at a bow-side end of a shaft of an inner main output gear 29, and return to a lubricant oil tank (not shown) which is set up in the engine room. In addition, an opening of a tip of the shaft of the inner main output gear 29 is closed by a stop flange 52.

The driving unit 30 adopted in the exemplary construction of FIG. 2 includes a first driving unit 31 that is the rotational driving power of the outer shaft 11 and a second driving unit 32 that is the rotational driving power of the inner shaft 12. The first driving unit 31 and the second driving unit 32 may be main engines, such as gas-turbine engines and diesel engines, or may be electric motors. In the case of the electric motors, for example, it is possible to load one or a plurality of gas turbine generators, diesel engine generators, etc. on the engine room, and it is possible to use this as a power.

The power transmission unit 20A adopted in the exemplary construction of FIG. 2 is a contra-rotating gear transmission unit which is constructed so that the rotational driving forces of the first driving unit 31 and the second driving unit 32 are independently transmitted to the outer shaft 11 and the inner shaft 12, respectively. More specifically, the power transmission unit 20A has a housing 21, and includes an outer transmission mechanism 18A, and an inner transmission mechanism 18B in the housing 21. In the construction of FIG. 2, both the outer transmission mechanism 18A and the inner transmission mechanism 18B are gear transmission mechanisms.

The outer transmission mechanism 18A has an outer input gear 22 which is arranged coaxially with an output shaft 31a of the first driving unit 31 and has the driving force from the first driving unit 31 input thereto, a hollow outer main output gear 24 serving as an outer output shaft which is arranged coaxially with the outer shaft 11 to transmit a rotational driving force to the outer shaft 11, and an outer intermediate small gear 23 which is arranged between the outer input gear 22 and the outer main output gear 24. The output shaft 31a of the first driving unit 31 and the outer input gear 22 are connected together via a gear coupling 33a so that a shaft center change caused by an error in installation and change of hull deformation is able to be absorbed. Although the number of the outer intermediate small gear 23 is one in FIG. 2, a plurality of intermediate small gears may be provided.

The inner transmission mechanism 18B has an inner input shaft 27 which is arranged coaxially with an output shaft 32a of the second driving unit 32 and has the driving force from the second driving unit 32 input thereto, an inner main output gear 29 which is inserted through the hollow portion of the outer output shaft 24, and is arranged coaxially with the inner shaft 12 to transmit a rotational driving force to the inner shaft 12, and an inner intermediate small gear 28 which is arranged between the inner input gear 27 and the inner main output gear 29. The output shaft 32a of the second driving unit 32 and the inner input gear 27 are connected together via a gear coupling 33b so that a shaft center change caused by an error in installation and change of hull deformation is able to be absorbed. Although the number of the inner intermediate small gear 28 is one in FIG. 2, a plurality of intermediate small gears may be provided. The inner main output gear 29 and the inner shaft 12 are connected and fixed together by an inner sleeve joint 26.

In the propulsion device 10A, an inner thrust bearing 41 which receives the thrust load (the combined load of the thrust load of only the inner shaft 12 and the thrust load of only the outer shaft 11) from the inner shaft 12 and transmits the thrust load to the ship body 2 is arranged. In the exemplary construction of FIG. 2, the inner thrust bearing 41 is provided at a bow-side portion of the housing 21 of the power transmission unit 20. For this reason, the thrust load from the inner shaft 12 is supported by the ship body 2 via the housing 21.

In addition, the arrangement position of the inner thrust bearing 41 is not limited to the above-described position if the thrust load from the inner shaft 12 is able to be transmitted to the ship body 2. Accordingly, the inner thrust bearing may be in the housing 21 and may be outside the housing 21 as long as the bearing is closer to the bow side than the outer output shaft 24.

In the exemplary construction of FIG. 2, although both the outer transmission mechanism 18A and the inner transmission mechanism 18B are gear transmission mechanisms, one or both may be other transmission mechanisms (a belt transmission mechanism, a chain transmission mechanism, etc.).

Additionally, in the exemplary construction of FIG. 2, although the outer transmission mechanism 18A and the inner transmission mechanism 18B are housed in the single housing 21, the mechanisms may be housed in separate housings 21.

The outer main output gear 24 and the outer shaft 11 are connected together via a hollow flexible joint 19. In the exemplary construction of FIG. 2, the flexible joint 19 is a gear coupling 19A, the outer main output gear 24 is connected and fixed to the bow side of the gear coupling 19A, and the outer intermediate shaft 17 is connected and fixed to the stern side of the gear coupling 19A. Accordingly, the rotational driving force of the outer main output gear 24 is transmitted to the outer shaft 11 via the gear coupling 19A, the outer intermediate shaft 17, and the outer sleeve joint 16. In addition, although a flanged flexible joint, a roller-chain joint, etc. may be used as the flexible joint 19, the gear coupling 19A which has a high allowable transmission torque and is able to allow not only angular displacement but axial displacement is suitable.

In order to prevent the spark erosion of a bearing caused by the potential difference between the outer shaft 11 and the ship body 2, the outer intermediate shaft 17 is provided with an outer short-circuiting unit 49. In order to prevent the spark erosion of a bearing caused by the potential difference between the inner shaft 12 and the ship body 2, the shaft of the inner main output gear 29 is made to protrude from a bow end of the housing 21, and the inner short-circuiting unit 48 is provided in this portion.

Figure 3:
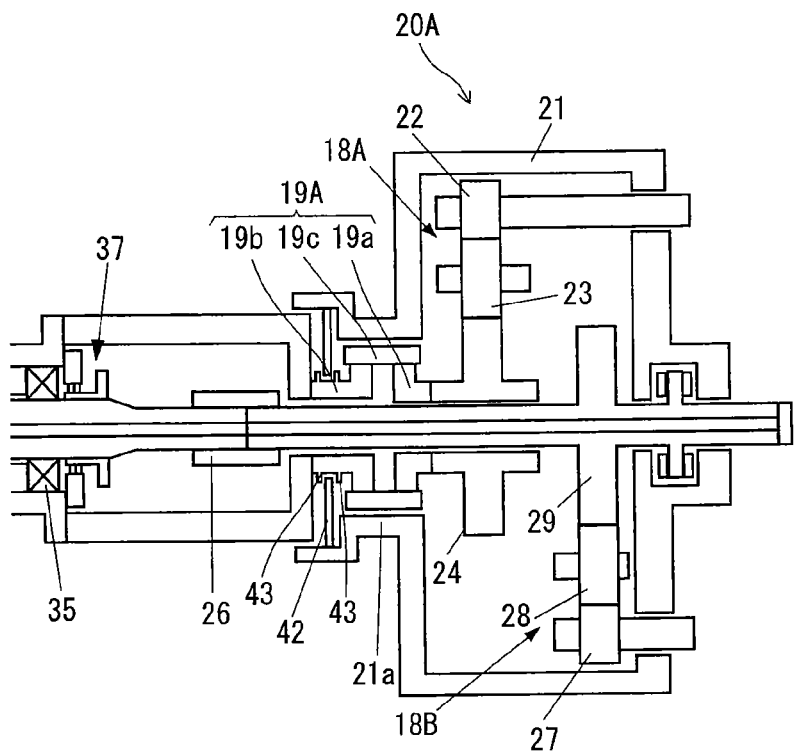
FIG. 3 is an enlarged plan view of the periphery of a gear coupling in FIG. 2.
Figure 4:
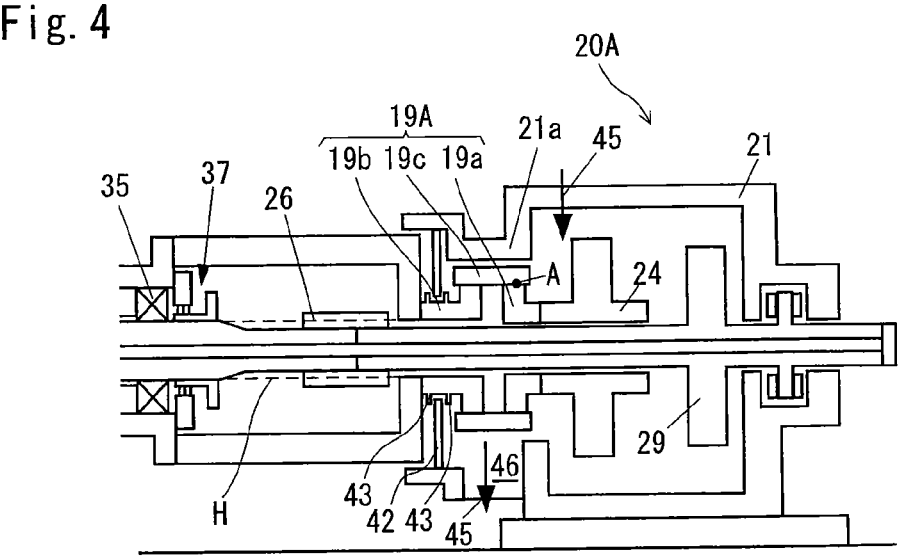
FIG. 4 is an enlarged side view of the periphery of the gear coupling in FIG. 2.

FIGS. 3 and 4 are enlarged views of the periphery of the gear coupling 19A in FIG. 2, FIG. 3 is a schematic plan view, and FIG. 4 is a schematic side view. The gear coupling 19A adopted in this exemplary construction includes a first inner cylinder 19a provided on the bow side, a second inner cylinder 19b provided on the stern side, and an outer cylinder 19c surrounding the first inner cylinder 19a and the second inner cylinder 19b, and absorbs the axial displacement, angular displacement, and parallel displacement of a shaft center to transmit the rotational driving force of the outer main output gear 24 towards the outer shaft 11.

Although the gear coupling 19A including the two inner cylinders 19a and 19b and one outer cylinder 19c is adopted in the exemplary construction of FIG. 3, a gear coupling including one inner cylinder and one outer cylinder may be adopted. It is possible to absorb axial displacement and angular displacement of a shaft center by this type of gear coupling.

By the above-described construction, when the first driving unit 31 is rotationally driven, the driving force thereof is transmitted to the outer shaft 11 via the outer transmission mechanism 18A, the gear coupling 19A, etc., and the front propeller 13 attached to the outer shaft 11 rotates. Additionally, when the second driving unit 32 is rotationally driven, the driving force thereof is transmitted to the inner shaft 12 via the inner transmission mechanism 18B and the inner sleeve joint 26, and the rear propeller 15 attached to the inner shaft 12 rotates.

At this time, the front propeller 13 and the rear propeller 15 are made to rotate in directions opposite to each other by making the outer shaft 11 and the inner shaft 12 rotate in directions opposite to each other. Although the rotational directions of driving shafts of the first driving unit 31 and the second driving unit 32 for making the front propeller 13 and the rear propeller 15 in directions opposite to each other depend on the construction of the power transmission unit 20, in the case of the exemplary construction of FIG. 2, the front propeller 13 and the rear propeller 15 rotate in directions opposite to each other if the rotational directions of the output shafts of the first driving unit 31 and the second driving unit 32 are opposite to each other.

As shown in FIG. 4, in order to lubricate the outer transmission mechanism 18A, the inner transmission mechanism 18B, and the gear coupling 19A, the lubricant oil 45 is supplied into the housing 21.

In FIGS. 3 and 4, a hood 21a which covers the gear coupling 19A is provided on the stern side of the housing 21. The housing 21 and the hood 21a communicate with each other and the lubricant oil is supplied to the gear coupling 19A in the hood 21a from the housing 21 side. The hood 21a may be formed integrally with the housing 21, or the housing 21 may be formed as a separate part. Additionally, in order to prevent the leakage of the lubricant oil towards the engine room, an oil-resist plate 42 which has a circular central opening is provided in the hood 21a in proximity with the outer periphery of the first inner cylinder 19b of the gear coupling 19A.

Two annular convex portions 43 which protrude radially outward and extend over the whole periphery in a peripheral direction are provided at an outer periphery of the second inner cylinder 19b so as to be separated from each other in the axial direction. The oil-resist plate 42 is arranged so that an inner peripheral end of a circular central opening thereof is inserted to between the two annular convex portions 43. This construction prevents the lubricant oil 45 from leaking towards the engine room from the gear coupling 19A side. In addition, an oil leakage preventing function may be further improved by a construction in which three or more annular convex portions 43 are provided so as to be separated from each other in the axial direction, two or more oil-resist plates 42 are provided, and an inner peripheral edge of a circular central opening of each oil-resist plate 42 is inserted between the annular convex portions 43.

In FIG. 4, when the gear coupling 19A is lubricated, the lubricant oil 45 penetrates from between the outer cylinder 19c and the first inner cylinder 19a (the position denoted by reference numeral A in FIG. 4), enters the outer intermediate shaft 17 through between the gear coupling 19A and the inner shaft 12, and is accumulated therein. Although the lubricant oil 45 accumulated in the outer intermediate shaft 17 rotates along with the outer intermediate shaft 17 and sticks to the inner surface of the outer intermediate shaft 17 due to the centrifugal force at that time, the lubricant oil 45 of an amount exceeding the storage capacity of the outer intermediate shaft 17 overflows from a circular opening provided on the bow side of the outer intermediate shaft 17. Thus, the lubricant oil is brought into a state like a hollow cylinder which has an inner peripheral surface with a position denoted by reference numeral H in the drawing as a fluid level. The lubricant oil 45 which has overflowed from the outer intermediate shaft 17 returns to the gear coupling 19A side, is discharged from a discharge port 46 through between the outer cylinder 19c and the first inner cylinder 19a or the second inner cylinder 19b, and is returned to the lubricant oil tank (not shown).

The fluid level position H of the lubricant oil 45 described above is a position where the contra-rotating front seal unit 37 is able to be lubricated, and the size of the diameter of a circular opening provided on the front side of the outer intermediate shaft 17 is set so that the lubricant oil 45 is accumulated up to this position. Such a construction brings the front side (bow side) of the contra-rotating front seal unit 37 into a wet state, so that it is possible to reduce heat generation of the contra-rotating front seal unit 37, and it is possible to extend the life.

According to the first embodiment of the invention described above, the following effects are obtained.

(1) The thrust load of the outer shaft 11 is received at the inner shaft 12 by the contra-rotating thrust bearing 40, the combined thrust load of the outer shaft 11 and the inner shaft 12 is received at the ship body 2 by the inner thrust bearing 41, and the rotational force of the outer output shaft 24 is transmitted to the outer shaft 11 via the gear coupling 19A that is the flexible joint 19. Thus, the thrust load of the outer shaft 11 is transmitted to the ship body 2 only via the inner shaft 12 without being directly transmitted to the ship body 2, and the misalignment of the axial center is allowed by the flexible joint 19, so that it is possible to eliminate to the influence of the change of hull deformation on the shaft center of the outer shaft 11. In particular, in the present embodiment, the gear coupling 19A capable of allowing not only angular displacement but axial displacement is adopted as the flexible joint 19. Therefore, it is possible to effectively eliminate the influence of the change of hull deformation on the shaft center of the outer shaft 11.

(2) Since the contra-rotating thrust bearing 40 is arranged in the boss of the front propeller 13, it is possible to construct a contra-rotating propeller unit by coaxially assembling the outer shaft 11 to which the front propeller 13 is attached and the inner shaft 12 to which the rear propeller 15 is attached by incorporation of the contra-rotating thrust bearing 40 in advance during manufacture. For this reason, it is possible to reduce assembling processes in the engine room by performing an incorporating process of the contra-rotating thrust bearing 40 before the contra-rotating propeller unit is loaded on the ship body 2.

(3) Since the hood 21a surrounding the gear coupling 19A is provided and the lubricant oil 45 is supplied to the gear coupling 19A, it is possible to effectively lubricate the gear coupling 19A. Additionally, since a labyrinth structure is formed by the oil-resist plate 42 and the annular convex portion 43, it is possible to more effectively prevent the leakage of the lubricant oil 45 from the gear coupling 19A side towards the engine room.

(4) Since the outer shaft 11 and the inner shaft 12 are respectively driven by the independent driving powers (the first driving unit 31 and the second driving unit 32), even if one of the driving powers (for example, the first driving unit 31) fails, it is possible to continue the operation of a ship by driving the front propeller 13 or the rear propeller 15 by the other driving power (for example, the second driving unit 32).

Figure 5:
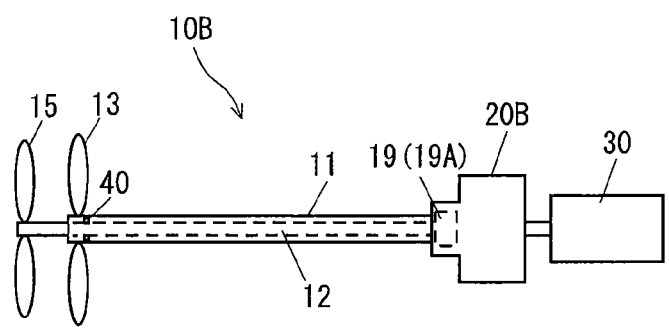
FIG. 5 is a schematic plan view of a contra-rotating propeller marine propulsion device according to a second embodiment of the invention.

FIG. 5 is a schematic plan view of a contra-rotating propeller marine propulsion device 10B according to a second embodiment of the invention. The present embodiment is different from the first embodiment in terms of the driving unit 30 and a power transmission unit 20B. Although FIG. 5 illustrating the present embodiment is simplified compared to FIG. 2 illustrating the first embodiment, the present embodiment is the same as the first embodiment regarding portions other than the driving unit 30 and the power transmission unit 20B.

As shown in FIG. 5, in the propulsion device 10B according to the present embodiment, one driving unit 30 is set up, and the power transmission unit 20B is a contra-rotating transmission unit which outputs the rotation of two shafts which rotate in directions opposite to each other, with respect to the rotation input of one shaft. That is, the power transmission unit 20B converts the rotational driving force of a driving unit into driving forces with rotational directions which are opposite to each other, and transmits the driving forces to the outer shaft 11 and the inner shaft 12, respectively. The rotation power of the outer output shaft of the power transmission unit 20B is transmitted to the outer shaft 11 via the gear coupling 19A similarly to the first embodiment.

According to the second embodiment of the invention described above, the effects of the above (1) to (3) in the first embodiment are obtained.

In addition, while the preferred embodiments of the invention have been described above, it should be understood that these are exemplary of the invention and the technical scope of the invention is not limited thereto. The scope of the invention is shown in the description of the appended claims. Additionally, various modifications may be made within the scope and the meaning equivalent to the description of the appended claims.

The invention claimed is:

1. A contra-rotating propeller marine propulsion device comprising:
    (a) a hollow outer shaft having a front propeller attached to a rear end thereof and rotatably supported by a ship body;
    (b) an inner shaft having a rear propeller attached to a rear end thereof and rotatably supported in the outer shaft;
    (c) a driving unit that is a rotational driving power of the outer shaft and the inner shaft;
    (d) a power transmission unit that transmits the rotational driving force of the driving unit to the outer shaft and the inner shaft, and making the front propeller and the rear propeller rotate in directions opposite to each other;
    (e) a contra-rotating thrust bearing connected to receive a thrust load from the outer shaft and transmits the thrust load to the inner shaft; and
    (f) an inner thrust bearing connected to receive the thrust load from the inner shaft and transmits the thrust load to the ship body,
    wherein the power transmission unit has an outer output shaft that is arranged coaxially with the outer shaft to transmit a rotational driving force to the outer shaft,
    wherein the outer output shaft and the outer shaft are connected together via a hollow flexible joint,
    wherein the outer output shaft and the outer shaft rotate in the same direction,
    wherein the flexible joint is a gear coupling,
    wherein the flexible joint absorbs axial displacement and angular displacement of a shaft center of the outer shaft to transmit a rotational driving force of the outer output shaft to the outer shaft, and
    wherein the gear coupling includes an first inner cylinder provided on the stern side, and an outer cylinder surrounding the inner cylinder and connected to transmit the rotational driving force of the outer output shaft to the inner cylinder.

2. The contra-rotating propeller marine propulsion device according to claim 1,
    wherein a hood that covers the gear coupling is provided on a stern side of the power transmission unit, and lubricant oil is supplied to the gear coupling,
    wherein the hood is provided with at least one oil-resist plate that has a circular central opening, wherein the gear coupling is inserted in the circular central opening, and wherein the oil-resist plate prevents or suppresses a leakage of the lubricant oil from the gear coupling side towards an engine room.

3. The contra-rotating propeller marine propulsion device according to claim 2,
    wherein two annular convex portions that protrude radially outward and extend over a whole periphery in a peripheral direction are provided at an outer periphery of the gear coupling so as to be separated from each other in an axial direction, and
    wherein the oil-resist plate is arranged so that an inner peripheral end of a central opening thereof is inserted between the two annular convex portions.

4. The contra-rotating propeller marine propulsion device according to claim 1,
    wherein a boss of the front propeller and the outer shaft are parts separate from each other, wherein the boss of the front propeller and the outer shaft are connected and fixed together in an axial direction, and an annular recess is formed between the boss of the front propeller and the outer shaft, and
    wherein the contra-rotating thrust bearing is provided in the annular recess.

5. The contra-rotating propeller marine propulsion device according to claim 1,
    wherein the driving unit includes a first driving unit that is a rotational driving power of the outer shaft, and a second driving unit that is a rotational driving power of the inner shaft, and wherein the power transmission unit independently transmits the rotational driving forces of the first driving unit and the second driving unit to the outer shaft and the inner shaft, respectively.

6. The contra-rotating propeller marine propulsion device according to claim 1, wherein the gear coupling further includes a second inner cylinder that is provided on the bow side and that is surrounded by the outer cylinder, and wherein the second inner cylinder transmits the rotational driving force of the outer output shaft to the outer cylinder.

\* \* \* \* \*